US 8,746,271 B2

(12) United States Patent
Antonsen

(10) Patent No.: US 8,746,271 B2
(45) Date of Patent: Jun. 10, 2014

(54) FLOW CONTROL VALVE

(75) Inventor: Peter S. Antonsen, Korsør (DK)

(73) Assignee: LeanVent ApS, Korsor (DK)

( * ) Notice: Subject to any disclaimer, the term of this patent is extended or adjusted under 35 U.S.C. 154(b) by 597 days.

(21) Appl. No.: 12/936,149

(22) PCT Filed: Apr. 3, 2009

(86) PCT No.: PCT/EP2009/054041
§ 371 (c)(1),
(2), (4) Date: Nov. 5, 2010

(87) PCT Pub. No.: WO2009/121965
PCT Pub. Date: Oct. 8, 2009

(65) Prior Publication Data
US 2011/0041921 A1   Feb. 24, 2011

(30) Foreign Application Priority Data

Apr. 3, 2008   (EP) .................................... 08154027

(51) Int. Cl.
*F16K 1/12*   (2006.01)
(52) U.S. Cl.
USPC .......................................................... 137/221
(58) Field of Classification Search
CPC ........... F16K 1/126; F16K 1/12; F16K 1/123; F16K 31/363; G05D 7/014
USPC .................................. 137/219, 220, 221, 222
See application file for complete search history.

(56) References Cited

U.S. PATENT DOCUMENTS

| | | | |
|---|---|---|---|
| 1,483,991 A | 2/1924 | Slattery | |
| 3,087,511 A | 4/1963 | Abild | |
| 3,198,204 A * | 8/1965 | Parks | 137/219 |
| 3,403,852 A | 10/1968 | Gorchev | |
| 3,617,151 A * | 11/1971 | Scroggins | 417/18 |
| 3,750,693 A * | 8/1973 | Hardison | 137/219 |
| 4,523,286 A | 6/1985 | Koga et al. | |
| 4,565,210 A * | 1/1986 | Heine et al. | 137/219 |
| 4,827,713 A * | 5/1989 | Peterson et al. | 60/226.1 |
| 6,742,539 B2 * | 6/2004 | Lyons | 137/219 |
| 7,353,837 B2 * | 4/2008 | Biester | 137/219 |

FOREIGN PATENT DOCUMENTS

| | | |
|---|---|---|
| DE | 19633074 A1 | 2/1997 |
| EP | 0287299 A2 | 10/1988 |
| EP | 1431639 A1 | 3/2004 |
| FR | 1297102 A | 6/1962 |
| FR | 1531598 A | 7/1968 |

(Continued)

*Primary Examiner* — Craig Schneider
*Assistant Examiner* — Frederick D Soski
(74) *Attorney, Agent, or Firm* — Muncy, Geissler, Olds & Lowe, P.C.

(57) ABSTRACT

A flow control valve (100;200;300) for a ventilation or exhaust duct comprises a housing (102;202;302), which defines a longitudinally extending passage (104;204;304) between a flow inlet and a flow outlet. A closing element (110;210;310) in the passage is movable between a fully open position and a fully closed position. A motor or actuator (116;216;316) is provided for moving the closing element. The motor or actuator may be located inside the closing element (110;210;310). The flow passage (104;204;304) through the housing may have sections of different diameters to obtain a venturi-like diffusor. A pressure difference sensor may be provided, which in combination with a position of the closing element allows for computation of the flow rate through the valve without the need for a separate flow meter.

10 Claims, 13 Drawing Sheets

(56) References Cited

FOREIGN PATENT DOCUMENTS

| | | |
|---|---|---|
| FR | 2610383 A1 | 8/1988 |
| FR | 2652631 A | 4/1991 |
| GB | 705881 | 3/1954 |
| GB | 996030 | 6/1965 |
| JP | 60-168974 A | 9/1985 |
| WO | WO-95/05565 | 2/1995 |
| WO | WO9917042 A1 | 4/1999 |

\* cited by examiner

FLOW CONTROL VALVE

TECHNICAL FIELD

The present invention relates to valve systems for controlling the flow of fluids, such as air and gasses, in ducts and pipe systems, particularly ventilation and exhaust ducts. The valve systems are primarily aimed at controlling flow rates.

BACKGROUND OF THE INVENTION

One type of state-of-the art flow control valves, in particular air control valves for ventilation ducts, typically comprises a valve plate which is arranged in the flow duct in such a way that the plate is rotatable around an axis which extends transversely to the fluid flow direction through the duct and valve. For applications requiring accurate flow control, so-called iris valves are sometimes applied, which are typically designed on the basis of a plurality of mutually displaceable plates, whereby, depending on the position of the plates, a clearance of a variable size is provided for the fluid flow. In respect of relatively large ducts, louvre valves are often used, which include a plurality of rotatable plates, which are arranged and designed to entirely close the duct.

Most of such valves do, however, result in a relatively large flow resistance, i.e. energy loss, as well as unsatisfactory generation of aerodynamic noise as a consequence of sharp edges provided by the valve plates.

Venturi valves are used in demanding applications, such as in laboratory exhaust systems. Such valves include a venturi nozzle arrangement with a movable cone, which is displaceable in the nozzle, whereby the flow rate of the fluid through the duct is controllable. Venturi valves are, however, relatively expensive, and their installation is complicated.

Pneumatic membrane valves or sliding valves are also known. Membrane valves operate by forcing a flexible membrane surrounding the fluid flow to open or close by application of air pressure. Such valves suffer from the drawback that they require a complex and expensive pneumatic installation for controlling the membrane. Sliding valves include a translationally movable plate, which is arranged to open or close a passage having the size of the plate, e.g. by means of a pneumatic cylinder. Its installation is, however, complex and expensive.

Flow meters are sometimes installed in connection with flow control valves. Though flow meters are often required, they add to the overall costs of the flow control equipment, and provide additional pressure loss.

SUMMARY OF THE INVENTION

It is an object of preferred embodiments of the present invention to provide a valve system, which overcomes or reduces some of the above drawbacks of state-of-the art systems. Specifically, it is an object of preferred embodiments of the invention to provide a flow control valve which is easy to install. It is a further object of preferred embodiments of the invention to provide a flow control valve which is inexpensive while having beneficial flow characteristics in terms of pressure loss and aerodynamical noise. It is a further object of the invention to provide a flow control valve which allows for easy and inexpensive measurement of the flow rate through the valve.

In a first aspect, the invention provides a flow control valve comprising:
 a housing, which defines a longitudinally extending passage between a flow inlet and a flow outlet of the housing;
 a closing element in the passage, wherein at least a portion of the closing element is movable between a fully open position, in which a fluid is allowed to flow past the closing element, and a fully closed position, in which it closes said passage, so that no fluid is allowed to flow past the closing element;
 a motor or actuator for causing at least said portion of the closing element to move between the open and closed positions;
wherein
 the motor or actuator is located in the closing element or in a separate motor casing in the passage.

As the motor or actuator is located inside the closing element, the flow control valve and motor/actuator may be shipped and installed as a single component. The motor or actuator may be electrical, hydraulic or pneumatic, i.e. driven by an electrical, hydraulic or pneumatic power source. Preferably, the motor may be arranged such in the closing element that it only needs to be plugged into or connected to an appropriate power source before being ready for operation.

The motor or actuator may be arranged to drive a driving element, which extends out of the closing element and engages a retention element, which is permanently fixed to the housing and/or to external structure, whereby the support may provide the reaction force required in order to allow the motor or actuator to move the closing element back and forth between the open and closed positions. The support may at the same time serve as a mechanical support for holding the closing element in correct alignment with the flow passage through the housing. Alternatively, a separate structure may be provided for holding and supporting the closing element. In one embodiment, the motor or actuator is arranged to drive a spindle, which extends through a wall of the closing element and engages a retention element outside the closing element.

In a yet further embodiment, the closing element comprises an outer shell including at least a stationary shell portion, which is fixed with respect to the housing, and a movable shell portion, which is movable with respect to the first shell portion. In this embodiment the motor or actuator is arranged to move the movable shell portion between the closed and the fully open positions. Preferably, the shell portions are arranged, so that essentially no air or gas flowing through the control valve is allowed to enter the space defined by the shells, which houses the motor or actuator. For example, a sealing element may be provided to close any gap between the shell portions. Alternatively, or in addition, the shell portions may have a mutual telescopic overlap, preferably an overlap covering the entire range of movement or displacement between the shell portions.

In order to facilitate access to the motor or actuator and/or in order to facilitate mounting thereof in the passage of the valve, the motor or actuator may be located in the separate motor casing. The motor casing may be arranged in the passage at a distance from the closing element, upstream or downstream thereof. The motor may be connected to the closing element via a driving element.

In order to minimize the manufacturing cost and reduce the number of components in the flow valves of the present invention, there is preferably provided no gear between the motor and the driven closing element. In such embodiments, the spindle driving the closing element is preferably provided directly on the output shaft of the motor, i.e. as one single, integrated part of the motor output shaft. However, for certain applications, in particular those, for which a large viscous flow resistance on the closing element has to be overcome by the motor, a gear may be appropriate or even necessary. For most applications, motors having a nominal power output of between 3 and 25 W and an output shaft velocity of about 1-50 rpm, such as around 10 rpm, have been found to be useful.

The closing element may be essentially spherical or aerodynamically shaped to define the shape of a cone or a droplet, with an elongated portion of the closing element extending from the closing element towards the outlet of the housing. By appropriate shaping of the closing element, flow separation and vortex generation at a downstream side of the closing element may be minimized.

The closing element may be arrestable in various positions between the fully open and the fully closed positions, so that the flow rate in the ventilation duct is controllable by appropriate control of the movement of the closing element. To this effect the flow control valve preferably comprises an electronic control unit for controlling operation of the motor or actuator. The electronic control unit may be located in the closing element or outside the closing element at a location in the passage in the housing, at a location in the housing outside the passage, or outside the housing. Maintenance or exchange of the control unit may be facilitated if it is located outside the closing element, whereas the provision of the control unit inside the closing element reduces the risk of damage.

The flow control valve may be controllable on the basis of the position of the closing element, on the basis of a flow rate measurement and/or on the basis of measurements of external parameters, such as measurements of temperature, or concentration or partial pressure of gas, such as NO, CO or $CO_2$. In one embodiment, the position of the closing element is controllable on the basis of a pressure measurement provided by a pressure sensor for detecting a pressure in the flow passage. The pressure sensor is preferably configured to pass an electronic signal representative of the pressure to the control unit, so that the control may be configured to control the movement of the closing element in response to at least said signal. In all of the aforementioned alternatives, a set-point for the controlled parameter or parameters may be provided as an operator input, e.g. in response to a flow-rate selection by an operator of a ventilating or exhaust system.

In one embodiment, the flow control valve of the present invention may further be adapted to measure a flow rate. The control valve may combine the function of a flow meter if a valve-specific constant of the valve or of the closing element is known. More specifically, the volume flow rate through the flow control valve may be expressed as $q = k\sqrt{\Delta p}$, where q expresses the volume flow rate, k is the valve-specific constant, and $\Delta p$ is the pressure difference across the closing element. The valve-specific constant may vary in dependence of the position of the closing element and may determined by a table look-up. It will hence be appreciated that the volume flow rate may be determined on the basis of a pressure difference across the closing element, and a position of the closing element between the fully open and the fully closed position. Hence, the flow control valve of the present invention may include:

a pressure difference sensor for detecting a pressure difference across the closing element;

a position sensor for detecting a position of the closing element between the fully open and the fully closed position; and an electronic memory loaded with a table of closing element positions and corresponding valve-specific flow constant values; and an electronic processor programmed to determine a flow rate based on the pressure difference, the position and a valve-specific constant at any detected position of the closing element.

The pressure difference sensor may include or form part of the pressure sensor for detecting pressure as described above. The position sensor may be provided as a separate sensor, or the position of the closing element may be determined on the basis of the control system for the motor, which may be arranged to keep track of the position of the closing element.

In order to minimize the pressure loss across the flow control valve, the cross-section of the passage may be larger at a position between said inlet and the closing element than at the inlet. Preferably, the cross-section of the passage is at no point smaller than the cross-section of the inlet, so as to avoid contractions which may cause pressure loss. Notably, a low pressure loss and low noise generation may be obtained if the closing element is arranged in a middle section of the passage, which has an increased diameter in relation to upstream and downstream sections. Hence, the flow passage through the housing may have an upstream inlet section of a first, relatively small diameter, a middle section of a second, relatively large diameter, and a downstream section of a diameter, which is smaller than the second diameter, with the closing element being provided in the middle section. By appropriate shaping of the closing element, in particular of its downstream-facing surface, the flow passage defined between the closing element and an inner wall of the housing may increase gradually in a diffusor- or venturi-like manner downstream of the closing element to provide adequate pressure recovery and generate only a minimum of aerodynamic noise. It will be appreciated that such a venturi-like arrangement may be provided by simple diameter variations of the flow passage and appropriate shaping of the closing element.

The closing element may be arranged to close near an inlet portion of the flow control valve, i.e. at a transition between the upstream inlet section of relatively small diameter and the middle section of relatively large diameter. Alternatively, the closing element may be arranged to close near an outlet portion of the flow control valve, i.e. at a transition between the middle section of relatively large diameter and the downstream section of relatively small diameter.

In order to minimize or eliminate vortices at the outer boundaries of the flow passage, gradual diameter changes are provided at the transitions between the sections of the flow passage, e.g. by curved wall sections of the housing.

In one embodiment, the flow cross-section of a clearance for fluid flow between the closing element and an inner wall of the housing is at least equal to the flow cross-section of the flow inlet and/or the flow outlet of the housing when the valve is fully open. Preferably, the flow cross-section of the passage through the housing is at any longitudinal position at least equal to the flow cross-section of the flow inlet of the housing. The passage in the housing may have a tapered constriction downstream of the closing element, which is preferably shaped to avoid or minimize flow separation or vortex generation.

In preferred embodiments the passage through the housing is essentially symmetrical with respect to an axis of revolution. However, the housing and/or closing element may be configured such that the clearance between the closing element and the inner wall of the housing is asymmetrical. By providing an asymmetrical arrangement, resonance vibrations may be avoided or reduced, and mechanical as well as acoustic vibrations may be reduced. Mechanical and/or acoustic vibrations may further be reduced by providing a dampening element for dampening vibrations of the closing element. The dampening element may for example comprise a mass in the closing element and/or a mass outside the closing element connected thereto by an elastic element.

In a second independent aspect, the invention relates to a flow control valve comprising:
- a housing, which defines a longitudinally extending passage between an flow inlet and a flow outlet of the housing;
- a closing element in the passage, wherein at least a portion of the closing element is movable between a fully open position, in which a fluid is allowed to flow past the closing element, and a fully closed position, in which it closes said passage, so that no fluid is allowed to flow past the closing element, wherein a clearance for fluid flow is provided between the closing element and an inner wall of the housing when said portion of the closing element is in the open position;

wherein the flow cross-section of the passage through the housing at any longitudinal position is at least equal to the flow cross-section of the flow inlet of the housing, when said portion of the closing element is in the fully open position.

It will be appreciated that the pressure loss across the flow control valve may be minimized when the flow cross-section of the passage through the housing at any longitudinal position is at least equal to the flow cross-section of the flow inlet of the housing. Preferably, the cross-section of the passage is at no point smaller than the cross-section of the inlet, so as to avoid contractions which may cause pressure loss. Notably, a low pressure loss and low noise generation may be obtained if the closing element is arranged in a middle section of the passage, which has an increased diameter in relation to upstream and downstream sections. Hence, the flow passage through the housing may have an upstream inlet section of a first, relatively small diameter, a middle section of a second, relatively large diameter, and a downstream section of a diameter, which is smaller than the second diameter, with the closing element being provided in the middle section. By appropriate shaping of the closing element, in particular of its downstream-facing surface, the flow passage defined between the closing element and an inner wall of the housing may increase gradually in a diffusor- or venturi-like manner downstream of the closing element to provide adequate pressure recovery and generate only a minimum of aerodynamic noise. It will be appreciate that such a venturi-like arrangement may be provided by simple diameter variations of the flow passage and appropriate shaping of the closing element. In order to minimize or eliminate vortices at the outer boundaries of the flow passage, gradual diameter changes are provided at the transitions between the sections of the flow passage, e.g. by curved wall sections of the housing.

In one embodiment, the flow cross-section of a clearance for fluid flow between the closing element and an inner wall of the housing is at least equal to the flow cross-section of the flow inlet and/or the flow outlet of the housing when the valve is fully open. Preferably, the flow cross-section of the passage through the housing is at any longitudinal position at least equal to the flow cross-section of the flow inlet of the housing. The passage in the housing may have a tapered constriction downstream of the closing element, which is preferably shaped to avoid or minimize flow separation or vortex generation.

The flow control valve according to the second aspect of the invention may include any of the features disclosed above in connection with the flow control valve according to the first aspect of the invention and its embodiments. Hence, the closing element may be essentially spherical, or aerodynamically shaped to define the shape of a cone or a droplet. The flow control valve may comprise a motor or actuator for causing the closing element to move between the open and closed positions. The motor or actuator may be located in the closing element. The motor or actuator may be arranged to drive a spindle, which extends through a wall of the closing element and engages a retention element outside the closing element. Alternatively, the motor or actuator may be located outside the closing element at a location in the passage in the housing, at a location in the housing outside the passage, or outside the housing. For example, the closing element may comprise an outer shell including at least a stationary shell portion, which is fixed with respect to the housing, and a movable shell portion, which is movable with respect to the first shell portion. In this embodiment the motor or actuator may be arranged to move the movable shell portion between the closed and the fully open positions. A sealing element may be provided to close any gap between the shell portions. Alternatively, or in addition, the shell portions may have a mutual telescopic overlap, preferably an overlap covering the entire range of movement or displacement between the shell portions.

The closing element may be arranged to close near an inlet portion of the flow control valve, i.e. at a transition between the upstream inlet section of relatively small diameter and the middle section of relatively large diameter. Alternatively, the closing element may be arranged to close near an outlet portion of the flow control valve, i.e. at a transition between the middle section of relatively large diameter and the downstream section of relatively small diameter.

In a further alternative, the motor or actuator is located in a motor casing, which is arranged in the passage at a distance from the closing element, whereby the motor is connected to the closing element via a driving element, such as a spindle or a linearly displaceable rod. The motor casing may be arranged upstream or downstream in the passage with respect to the closing element. Preferably, if the closing element closes near an inlet section of the passage, the motor casing is provided downstream of the closing element, whereas, if the closing element closes near an outlet section of the passage, the motor casing is provided upstream of the closing element.

The flow control valve may further comprise an electronic control unit for controlling operation of the motor or actuator, wherein the electronic control unit is located in the closing element or outside the closing element at a location in the passage in the housing, at a location in the housing outside the passage, or outside the housing. A pressure sensor may be provided for detecting a pressure in the flow passage, and the pressure sensor may configured to pass an electronic signal representative of the pressure to the control unit, and the control unit may be configured to control the movement of the closing element in response to at least said signal. Further, a pressure difference sensor may be provided for detecting a pressure difference across the closing element, and a position sensor may be provided for detecting a position of the closing element between the fully open and the fully closed position. An electronic memory loaded with a table of closing element positions and corresponding valve-specific flow constant values may be provided, which is connected to an electronic processor programmed to determine a flow rate based on the pressure difference, the position and a valve-specific constant at any detected position of the closing element. The passage through the housing may be essentially symmetrical with respect to an axis of revolution, and the housing and/or closing element may be configured such that said clearance is asymmetrical. A dampening element for dampening vibrations of the closing element may be provided.

The description of the features mentioned above and variations thereof set forth in connection with the flow control valve of the first aspect of the invention applies mutatis mutandis to embodiments of the flow control valve of the second aspect of the invention.

In a third aspect the invention provides a flow control valve comprising:
- a housing, which defines a longitudinally extending passage between an flow inlet and a flow outlet of the housing;
- a closing element in the passage, wherein at least a portion of the closing element is movable between a fully open position, in which a fluid is allowed to flow past the closing element, and a fully closed position, in which it closes said passage, so that no fluid is allowed to flow past the closing element, wherein a clearance for fluid flow is provided between the closing element and an inner wall of the housing when said portion of the closing element is in the open position;

wherein
- a pressure difference sensor for detecting a pressure difference across the closing element;
- a position sensor for detecting a position of the closing element or said portion thereof between the fully open and the fully closed position; and
- an electronic memory loaded with a table of positions of the closing element or said portion thereof and corresponding valve-specific flow constant values; and
- an electronic processor programmed to determine a flow rate based on the pressure difference, the position and a valve-specific constant at any detected position of the closing element or said portion thereof.

Thus the flow control valve of the present invention may further be adapted to measure a flow rate without implementation of a separate flow meter, as the flow control valve combines the function of a flow meter. More specifically, the volume flow rate through the flow control valve may be expressed as $q=k\sqrt{\Delta p}$, where q expresses the volume flow rate, k is the valve-specific constant, and $\Delta p$ is the pressure difference across the closing element. The valve-specific constant may vary in dependence of the position of the closing element and may determined by a table look-up. It will hence be appreciated that the volume flow rate may be determined on the basis of a pressure difference across the closing element, and a position of the closing element between the fully open and the fully closed position. The position sensor may be provided as a separate sensor, or the position of the closing element may be determined on the basis of the control system for the motor, which may be arranged to keep track of the position of the closing element.

Embodiments of the flow control valve according to the third aspect of the invention may include any of the features described above in connection with the flow control valves according to the first and second aspects of the invention and embodiments thereof.

In one embodiment, the flow control valves of the present invention are utilized to control a flow of gas, such as air, in a flow system. Hence, the method provides a method for controlling a flow of gas in a flow system, the method comprising the step of arranging a flow control valve according to any of the first, second or third aspects in the flow system, and operating the flow control valve to control the flow of gas in the flow system. The invention is particularly well-suited for gasses, such as air, as the viscous flow resistance of gasses is relatively low as compared to that of liquids, such as water, and hence the power consumption of the flow control valve is relatively low. This, in turn, brings about the advantage that commercially available step motors may be employed, without any need for a gear between the motor and driven closing element.

Furthermore, the invention also makes it possible to utilize the available space inside the closing element for en electric motor. This space is relatively large in a gas flow valves (e.g. air flow valves) compared to the space available in a liquid valve, and the invention is, therefore, particularly advantageous for gas flow valves. Preferred embodiments of the present invention also seek to minimize the number of electrical and mechanical connections through the valve casing, and thereby provide a compact and inexpensive gas flow valve design. This design is particularly useful for gas flow valves, but may also be applied for liquid flow valves. However, in liquid flow valves a relatively high driving power is required, and the driving motor requires protection against the liquid for it to be able to be submerged in liquid.

In any and all aspect and embodiments of the present invention, at least a part of the closing element and/or a part of the housing may covered with a material having sound and/or vibration damping characteristics. Hence, vibrations and/or noise may be reduced. For example, embodiments of the invention may be prepared for active sound attenuation, which implies that part of the closing element and part of the housing are covered with a layer of soft and solid material that together reduce the incoming noise level and prevent further generation of noise inside the valve.

In the various aspects and embodiments of the present invention, at least the closing element and the housing may be produced from a fire resistant material. Hence, embodiments of the invention may be prepared for smoke and fire protection, which implies that all vital parts of embodiments of the invention may be produced from fire resistant materials that can withstand strong heat for a long period, and that part of the closing element and part of the housing are covered with a layer of fire resistant material, e.g. a ceramic foam. Valves according to the invention may furthermore be configured to close tightly to meet regulations for protection against spreading of smoke and fire to other sections in a building.

In a further aspect, the invention provides a flow duct comprising at least two separable sections, each of which has a first end of a first diameter and a second end of a second diameter, the second diameter being larger than the first diameter, and wherein:
- in a first configuration of the flow duct, the first ends of the two sections define an inlet and an outlet of the flow duct, respectively; and wherein
- in a second configuration of the flow duct, the second ends of the two sections define an inlet and an outlet of the flow duct, respectively.

The first and second ends may be directly attachable to each other, so that their respective ends of second or first diameter are in abutting engagement. Alternatively, one or more further flow duct sections of cylindrical or conical shape may be arranged between the two sections. Thanks to the provision of the plurality of flow duct sections, each of which has one diameter at one end, and another diameter at the other end, the flow duct section may fit into ducts of at least two different diameters. In embodiments of the duct, the flow duct may include flow measurement equipment and/or a flow control valve. The flow duct of the present invention may hence form the outer shell housing such measurement equipment or flow control valve. It may be manufactured at one size to fit at least two different standard flow duct sizes.

One benefit of the present flow duct is that it makes it possible to select a valve size and valve design that fits very precisely for a specific application with regard to pressure loss, energy consumption, noise level, overall size and price. The first configuration will e.g. be advantageous for applications with demands for very low pressure loss and sound generation, whereas the second configuration will be chosen for applications with minimum space for valves and ducts.

The present invention further provides a flow system comprising:
- a tube, pipe or duct;
- a fan for drawing a flow of fluid through the tube, pipe or duct;
- at least one flow control valve according to any of the first, second, third or fourth aspects of the invention, the flow control valve being arranged in the tube, pipe or duct.

DESCRIPTION OF THE DRAWINGS

Embodiments of the invention will now be described with reference to the drawings, in which:

FIGS. 1 and 2 show an embodiment of a flow control valve 100 incorporating the inventions of the first, second and third aspects of the invention. FIG. 1 shows the valve in its fully open position, and FIG. 2 shows the valve in its fully closed position. The valve 100 has a housing 102 defining a flow passage 104, which extends between a flow inlet 106 and a flow outlet 108. The valve is suitable for attachment to respective end portions of pipe sections of a ventilation or exhaust duct. The valve 100 further comprises a spherical closing element 110, which at its downstream face is extended by a conical element 112 for improving the aerodynamical properties, i.e. for minimizing or eliminating the risk of flow separation. In FIG. 1, the valve is shown in its open position, wherein a clearance 114 is provided between the closing element 110 and an inner wall of the housing 102. As shown by arrows in FIG. 1, a fluid flow, such as flow of air or another gas, may flow from the inlet 106 to the outlet 108 past the closing element 110 through the clearance 114.

In FIG. 1, the closing element 110 is drawn to its upstream extremity, whereas in FIG. 2, the closing element 110 is shown in its downstream extremity, in which it rests against a conical wall portion 103 of the housing 102, so as to prevent fluid from passing out of the outlet 108.

Figure 1:
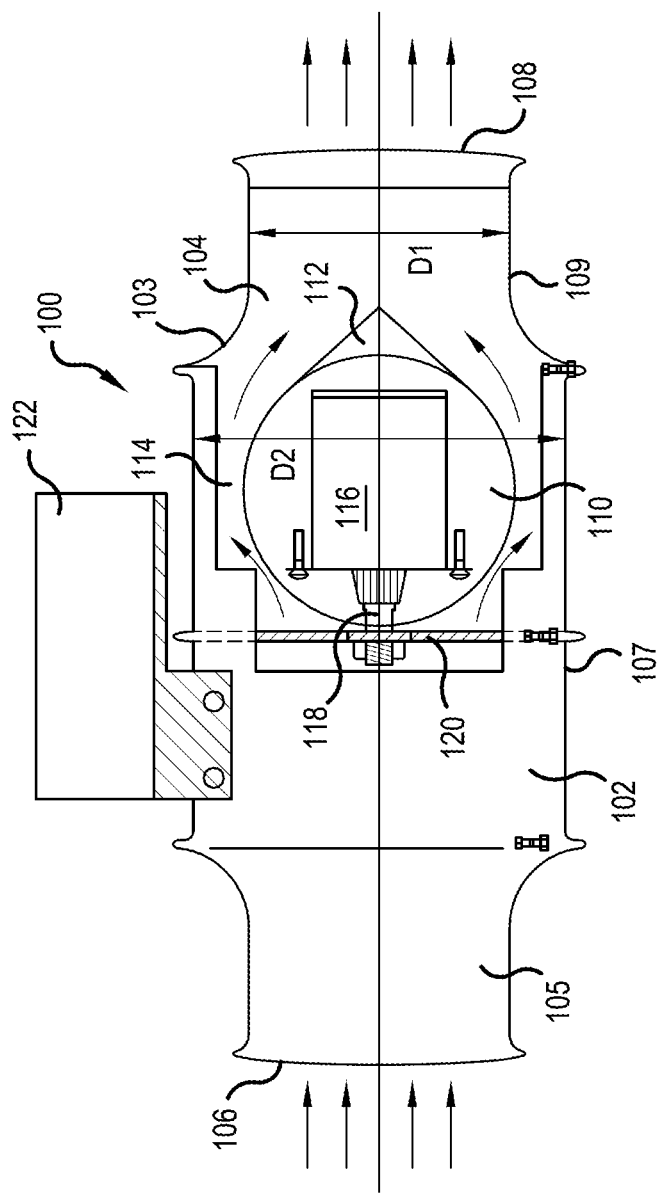
FIGS. 1 and 2 illustrate an embodiment of a flow control valve according to the first, second and third aspects of the invention.

Near the inlet and outlet, the flow passage 104 has a first diameter D1, which is smaller than a second diameter D2 at a middle section of the flow passage. More specifically, the housing 102 has an upstream section 105, wherein the diameter of the flow passage 104 is D1, a middle section 107, wherein the diameter of the flow passage 104 is D2, and a downstream section 109, wherein the diameter of the flow passage 104 is D1. The transition between the middle section 107 and the downstream section 109 is formed by the conical wall portion 103 which serves as an abutment surface for the closing element 110 when the closing element is in its closed position. Thanks to the aerodynamic shape of the closing element 110 and its cone 112, flow separation and vortex generation may be avoided or minimized, thereby maximizing pressure recovery.

Figure 2:
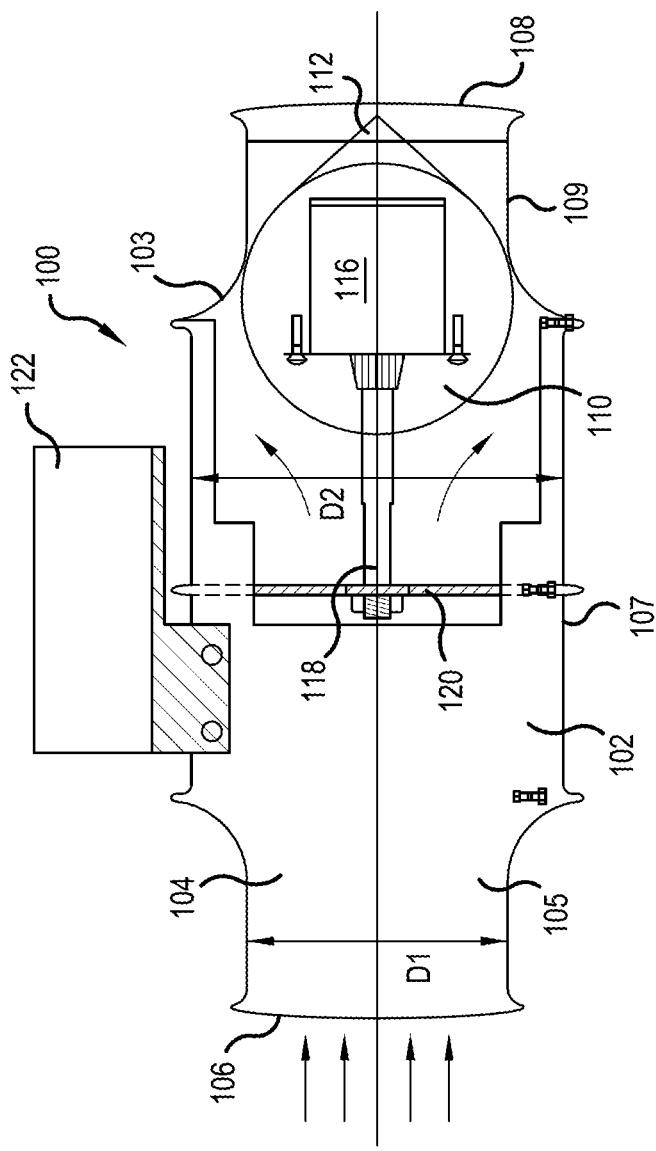

In order to move the closing element 110 between its open and closed positions, a motor 116 is provided in the closing element 110. The motor 116 drives a spindle 118, which extends out of the closing element and engages a retention element 120, which in turn is supported by a wall partition of the housing 102. Operation of the motor 116 is controlled by a control unit 122 which is secured to an outer wall portion of the housing 102. In other embodiments, the control unit is also incorporated in the housing. Operation of the motor 116 may be controllable to arrest the closing element 110 at any desired position between the fully open position of FIG. 1 and the fully closed position of FIG. 2.

Figure 3:
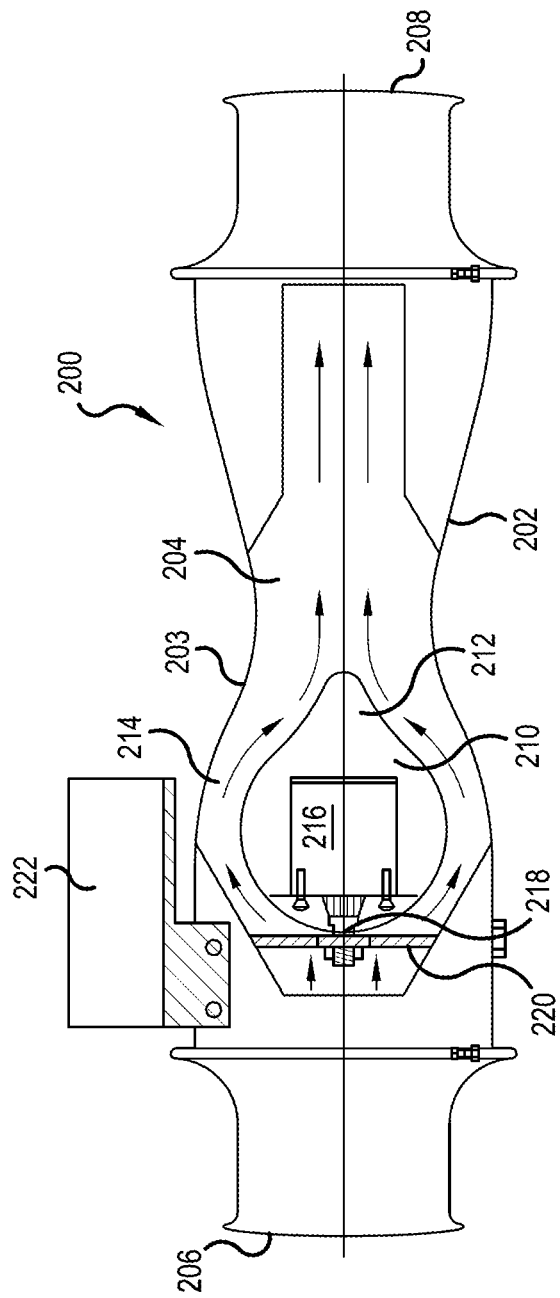
FIGS. 3 and 4 illustrate an embodiment of a flow control valve according to the first and third aspects of the invention.
Figure 4:
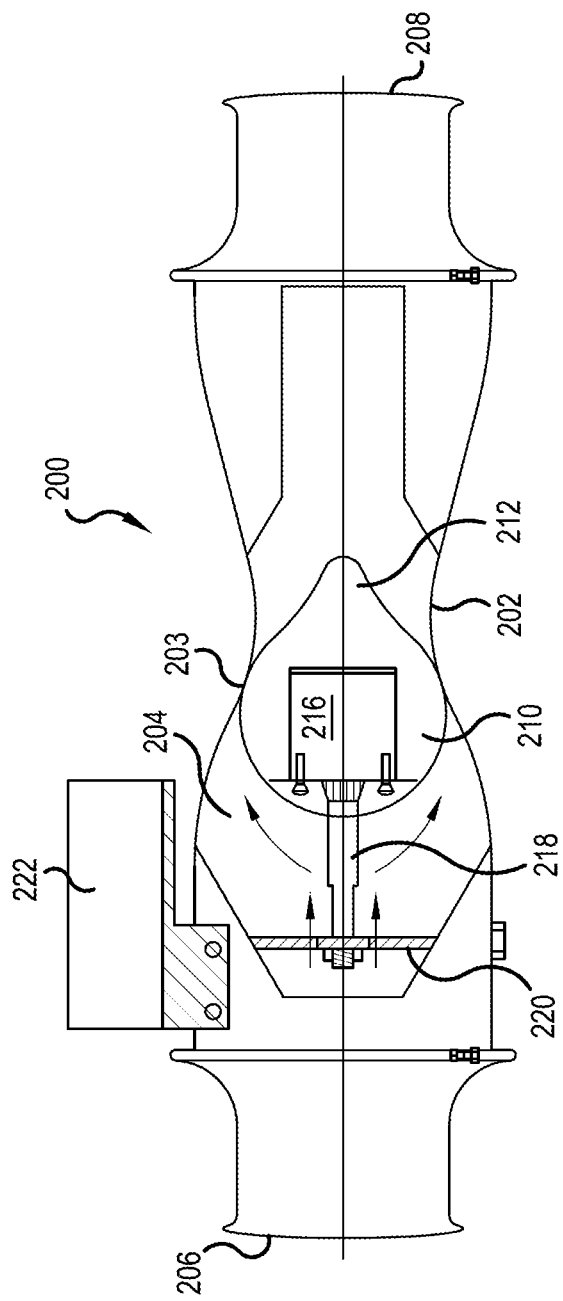

FIGS. 3 and 4 show an embodiment of a flow control valve 200 incorporating the invention of the second and third aspects of the invention. FIG. 3 shows the valve in its fully open position, and FIG. 4 shows the valve in its fully closed position. The valve 200 has a housing 202 defining a venturi-like flow passage 204, which extends between a flow inlet 206 and a flow outlet 208. The valve 200 further comprises a closing element 210, which at its upstream surface is essentially hemispherical, and which at its downstream face forms a cone 212. In FIG. 3, the valve is shown in its open position, wherein a clearance 214 is provided between the closing element 210 and an inner wall of the housing 202.

In FIG. 3, the closing element 210 is drawn to its upstream extremity, whereas in FIG. 4, the closing element 210 is shown in its downstream extremity, in which it rests against a conical wall portion 203 of the housing 202.

In order to move the closing element 210 between its open and closed positions, a motor 216 is provided in the closing element 210 in the same manner as described above in connection with the embodiment of FIGS. 1 and 2. The motor 216 drives a spindle 218, which extends out of the closing element and engages a retention element 220, which in turn is supported by a wall partition of the housing 202. Operation of the motor 216 is controlled by a control unit 222 which is secured to an outer wall portion of the housing 200.

The retention element 120 and 220 is shown upstream of the closing element 110 and 210 in FIGS. 1-4. It will however be understood that the retention element 120 and 220 may also be provided at a location downstream of the closing element 110 and 210.

Figure 5:
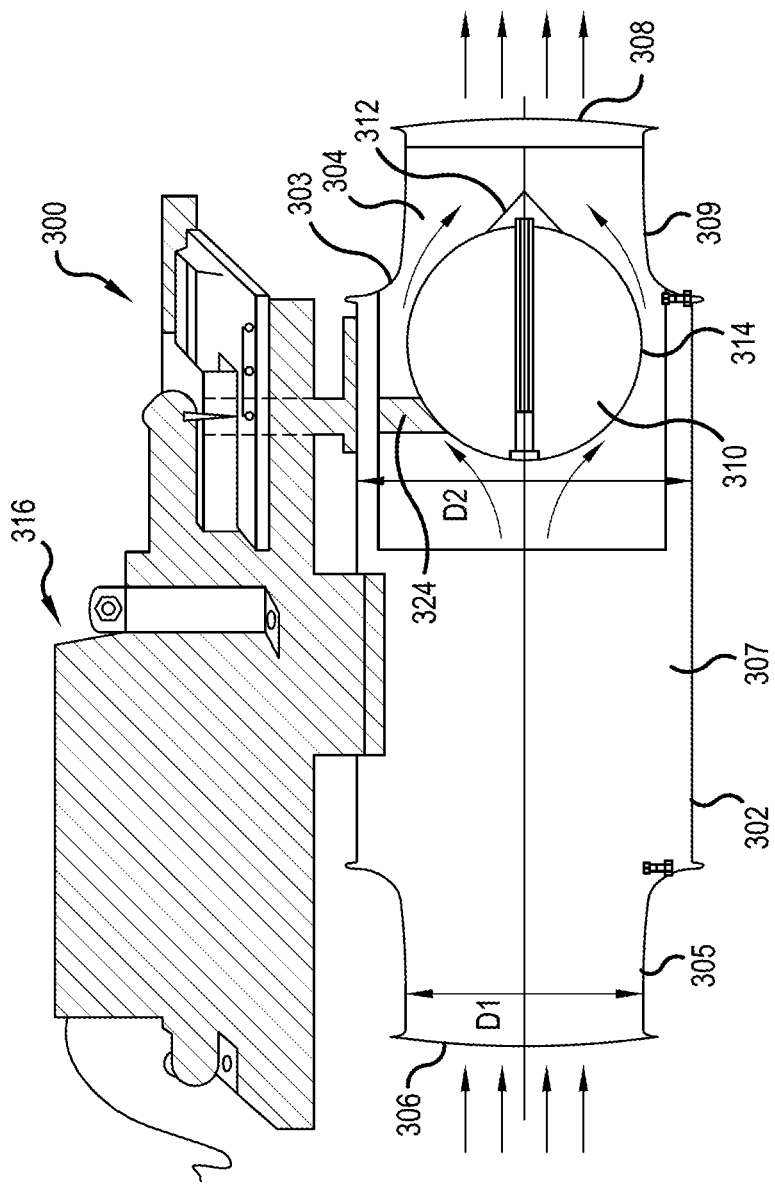
FIGS. 5 and 6 illustrate an embodiment of a flow control valve according to the second and third aspect of the invention.
Figure 6:
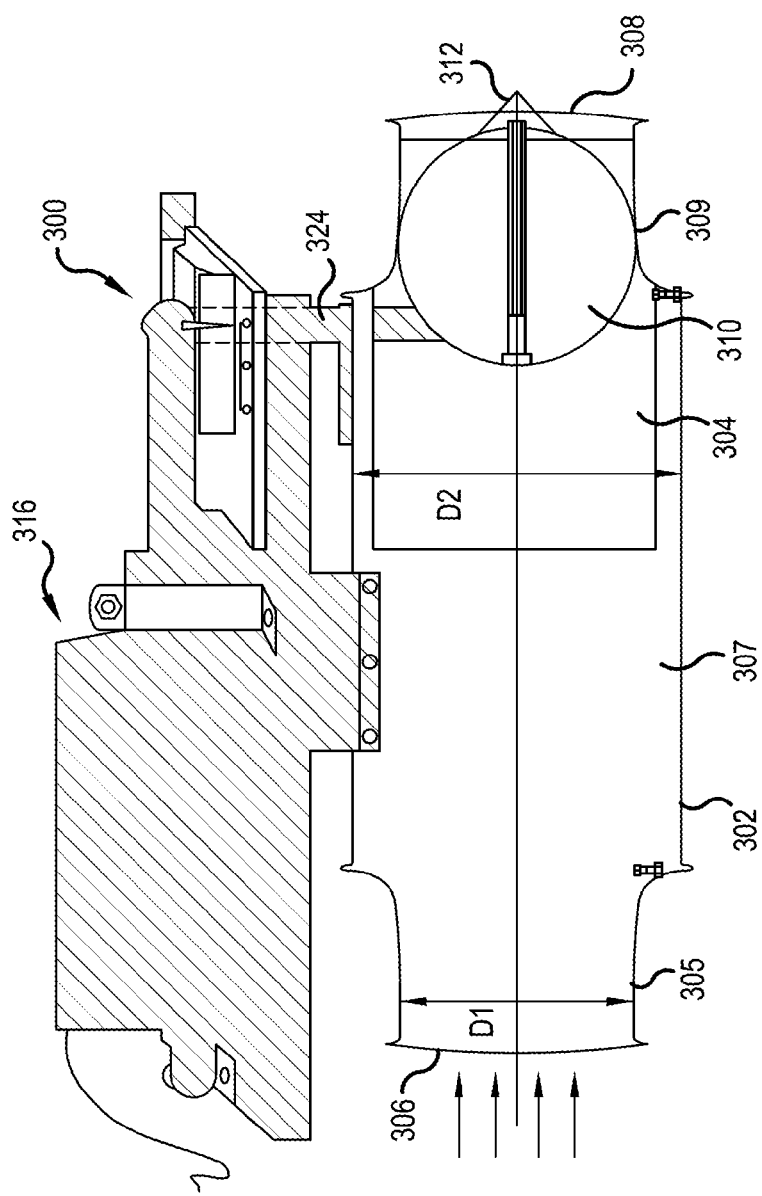

FIGS. 5 and 6 show an embodiment of a flow control valve 300 according to the second aspect and third aspects of the invention. FIG. 5 shows the valve in its fully open position, and FIG. 6 shows the valve in its fully closed position. The valve housing 302 defines a flow passage 304, which extends between a flow inlet 306 and a flow outlet 308. The valve 300 further comprises a spherical closing element 310, which at its downstream face is extended by a conical element 312. In FIG. 5, the valve is shown in its open position, wherein a clearance 314 is provided between the closing element 310 and an inner wall of the housing 302. As shown by arrows in FIG. 1, a fluid flow, such as flow of air or another gas, may flow from the inlet 306 to the outlet 308 past the closing element 310 through the clearance 314.

In FIG. 5, the closing element 310 is drawn to its upstream extremity, whereas in FIG. 6, the closing element 310 is shown in its downstream extremity, in which it rests against an inner wall portion of housing section 309, so as to prevent fluid from passing out of the outlet 308.

Near the inlet and outlet, the flow passage 304 has a first diameter D1, which is smaller than a second diameter D2 at a middle section of the flow passage. More specifically, the housing 302 has an upstream section 305, wherein the diameter of the flow passage 304 is D1, a middle section 307, wherein the diameter of the flow passage 304 is D2, and a downstream section 309, wherein the diameter of the flow passage 304 is D1. The transition between the middle section 307 and the downstream section 309 is formed by a conical wall portion 303 which serves as an abutment surface for the closing element 310 when the closing element is in its closed position.

In order to move the closing element 310 between its open and closed positions, an actuator 316 is secured to an outer surface of the housing 302. The actuator 316 drives a member 324, which extends into the flow passage 304 and engages the closing element 310. Operation of the motor 316 is controlled by a control unit (not shown).

Figure 7:
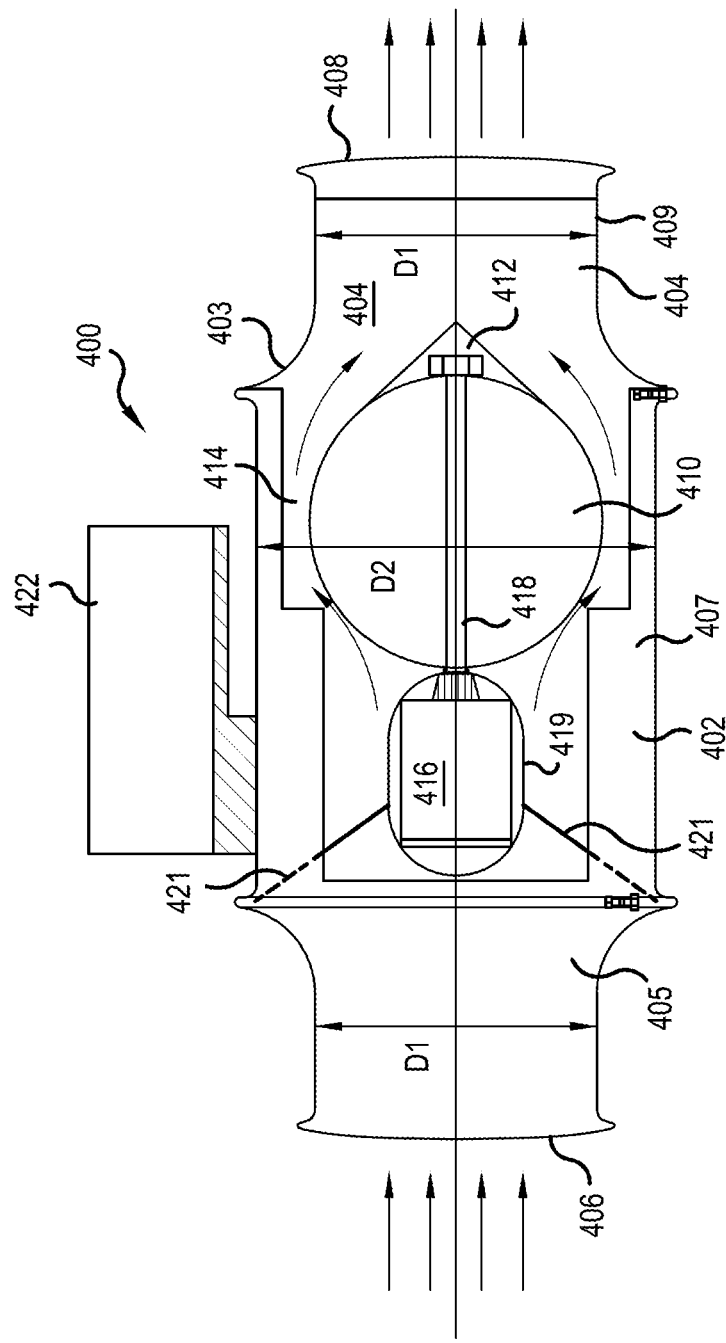
FIGS. 7 and 8 illustrate an embodiment of a flow control valve according to the second and third aspects of the invention.
Figure 8:
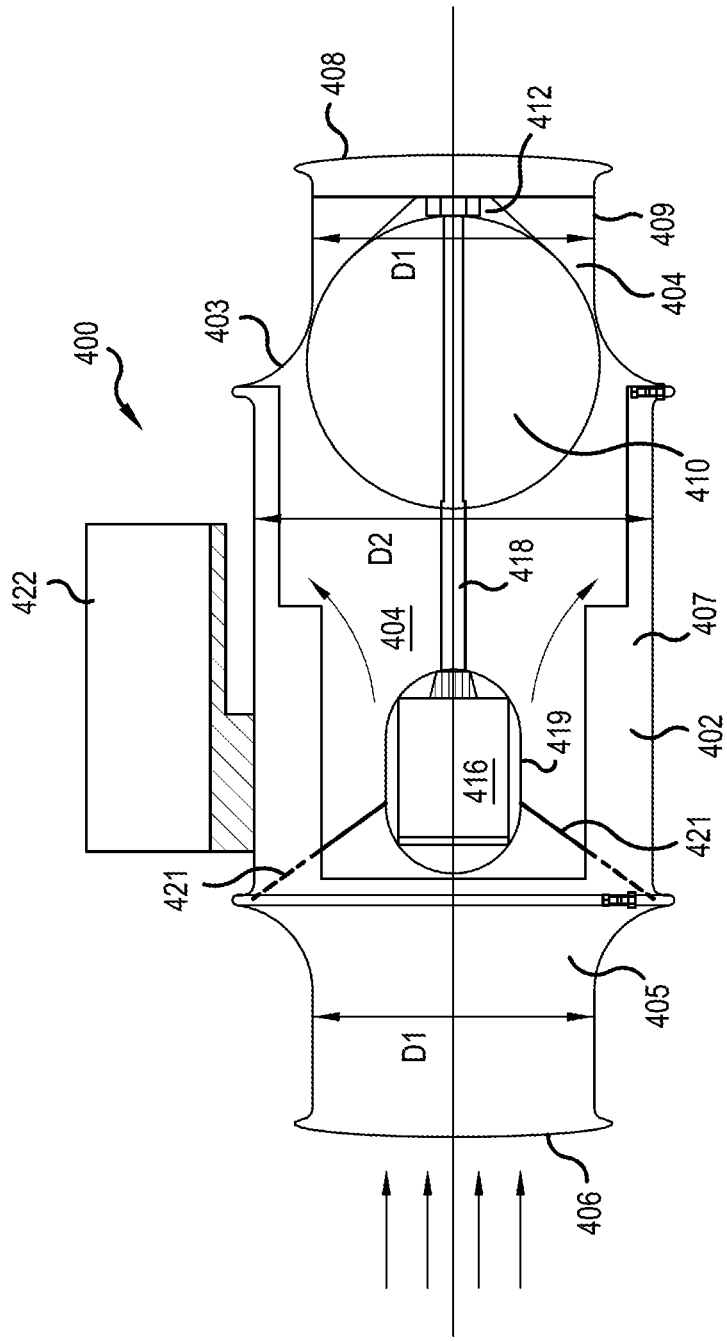

FIGS. 7 and 8 show a yet further embodiment of a flow control valve 400 incorporating the inventions of the various aspects of the invention. FIG. 7 shows the valve in its fully open position, and FIG. 8 shows the valve in its fully closed position. The valve 400 has a housing 402 defining a flow passage 404, which extends between a flow inlet 406 and a flow outlet 408. The valve is suitable for attachment to respective end portions of pipe sections of a ventilation or exhaust duct. The valve 400 further comprises a spherical closing element 410, which at its downstream face is extended by a conical element 412. In FIG. 7, a clearance 414 is provided between the closing element 410 and an inner wall of the housing 402. In FIG. 8, the closing element 410 is shown in its downstream extremity, in which it rests against a conical wall portion 403 of the housing 402, so as to prevent fluid from passing out of the outlet 408.

Near the inlet and outlet, the flow passage 404 has a first diameter D1, which is smaller than a second diameter D2 at a middle section of the flow passage. More specifically, the housing 402 has an upstream section 405, wherein the diameter of the flow passage 404 is D1, a middle section 407, wherein the diameter of the flow passage 404 is D2, and a downstream section 409, wherein the diameter of the flow passage 404 is D1. The transition between the middle section 407 and the downstream section 409 is formed by the conical wall portion 403 which serves as an abutment surface for the closing element 410 when the closing element is in its closed position. Thanks to the aerodynamic shape of the closing element 410 and its cone 412, flow separation and vortex generation may be avoided or minimized, thereby maximizing pressure recovery.

In order to move the closing element 410 between its open and closed positions, a motor 416 is provided in a separate motor casing 419. The motor 416 drives a spindle 418, which extends out of the casing 419 and engages the closing element 410. The casing 419 is supported by a wall partition of the housing 402 and connected thereto by cross bars 421. Operation of the motor 416 is controlled by a control unit 422 which is secured to an outer wall portion of the housing 402. In other embodiments, the control unit is also incorporated in the housing. Operation of the motor 116 may be controllable to arrest the closing element 410 at any desired position between the fully open position of FIG. 7 and the fully closed position of FIG. 8.

Figure 9:
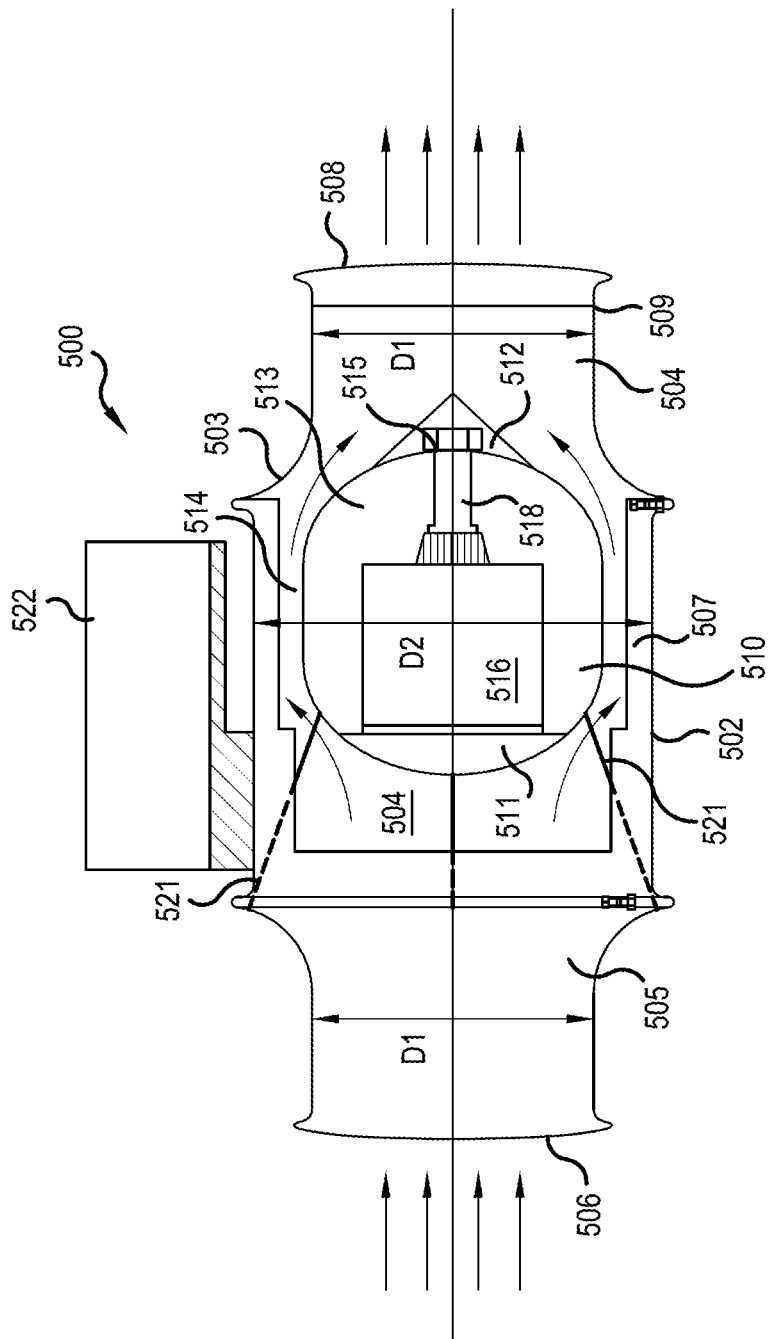
FIGS. 9 and 10 illustrate an embodiment of a flow control valve according to the first, second and third aspects of the invention.
Figure 10:
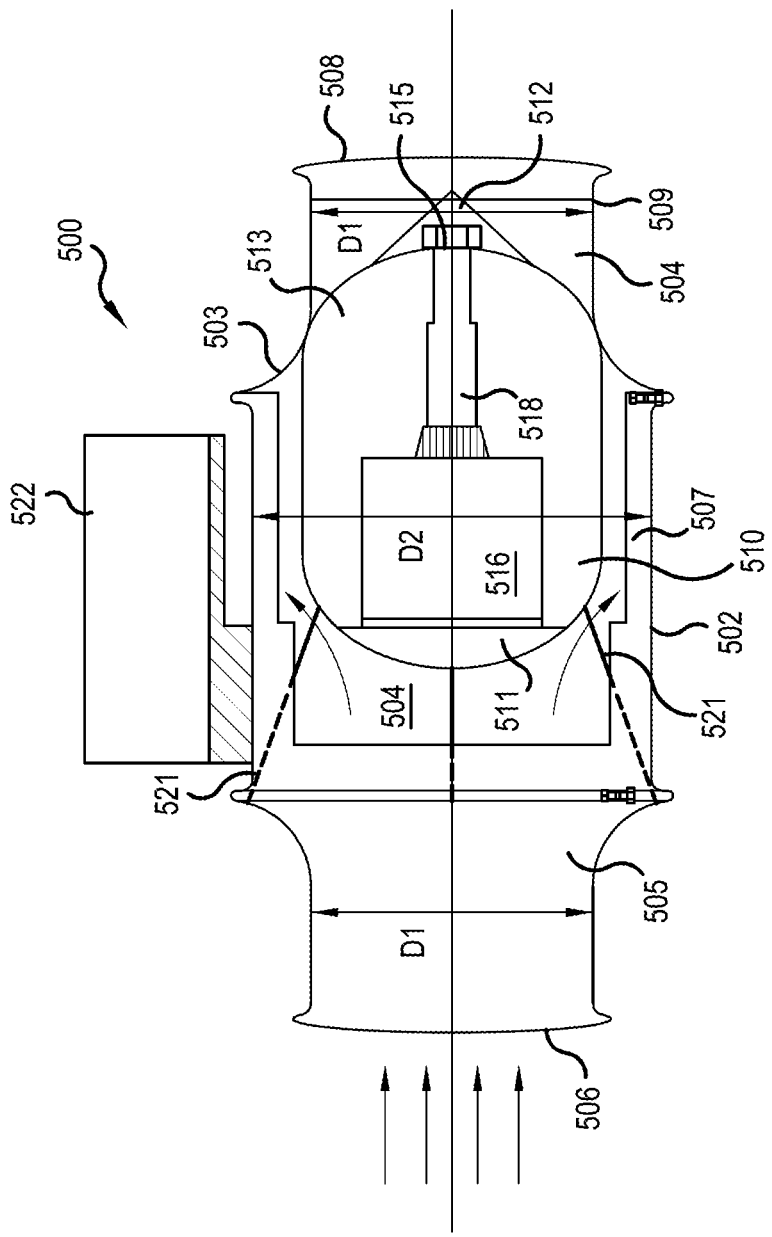

FIGS. 9 and 10 show an embodiment of a flow control valve 500 incorporating the inventions of the various aspects of the invention. FIG. 9 shows the valve in its fully open position, and FIG. 10 shows the valve in its fully closed position. The valve 500 has a housing 502 defining a flow. passage 504, which extends between a flow inlet 506 and a flow outlet 508. The valve 500 further comprises a telescopic closing element 510, which at its downstream face is extended by a conical element 512. The closing element 510 comprises overlapping first and second shell portions 511 and 513. In FIG. 9, the valve is shown in its open position, wherein a clearance 514 is provided between the closing element 510 and an inner wall of the housing 502, with the shell portions 511 and 513 being drawn as closely together as possible.

In FIG. 10, the closing element 510 is shown in its closed position, with the second shell portion being drawn to its downstream extremity, in which it rests against a conical wall portion 503 of the housing 502, so as to prevent fluid from passing out of the outlet 508.

Near the inlet and outlet, the flow passage 504 has a first diameter D1, which is smaller than a second diameter D2 at a middle section of the flow passage. More specifically, the housing 502 has an upstream section 505, wherein the diameter of the flow passage 504 is D1, a middle section 507, wherein the diameter of the flow passage 504 is D2, and a downstream section 509, wherein the diameter of the flow passage 504 is D1. The transition between the middle section 507 and the downstream section 509 is formed by the conical wall portion 503 which serves as an abutment surface for the second shell portion 513 of the closing element 510 when the closing element is in its closing condition.

In order to move the second shell portion 513 between its open and closed positions, a motor 516 is provided in the closing element 510. The motor 516 drives a spindle 518, which engages an outer, distal end surface of the closing element at 515. The first shell portion 513 is supported by a wall partition of the housing 502 and connected thereto by cross bars 521. Operation of the motor 516 is controlled by a control unit 522 which is secured to an outer wall portion of the housing 502. In other embodiments, the control unit is also incorporated in the housing. Operation of the motor 516 may be controllable to arrest the second shell portion 513 of the closing element 110 at any desired position between the fully open position of FIG. 9 and the fully closed position of FIG. 10.

Figure 11:
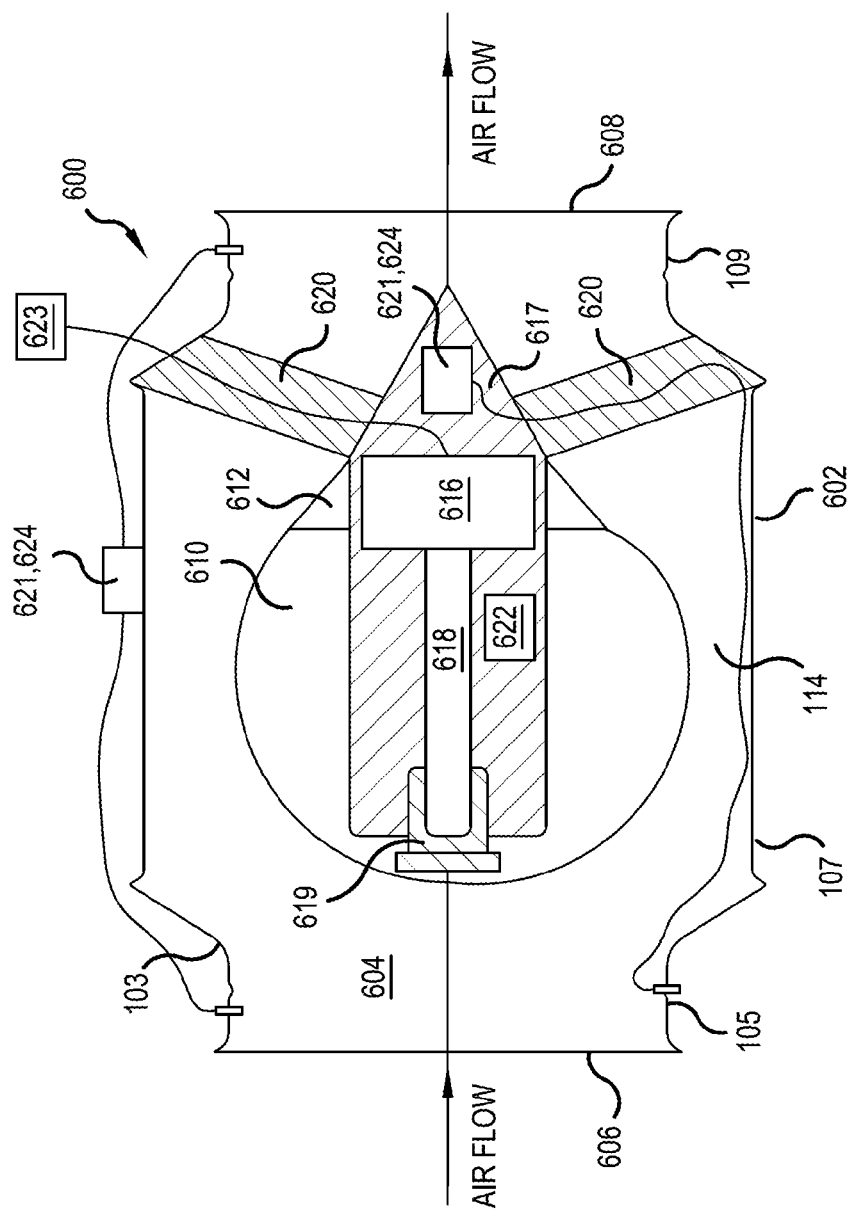
FIGS. 11 and 12 illustrate an embodiment of a flow control valve according to the first, second and third aspects of the invention.
Figure 12:
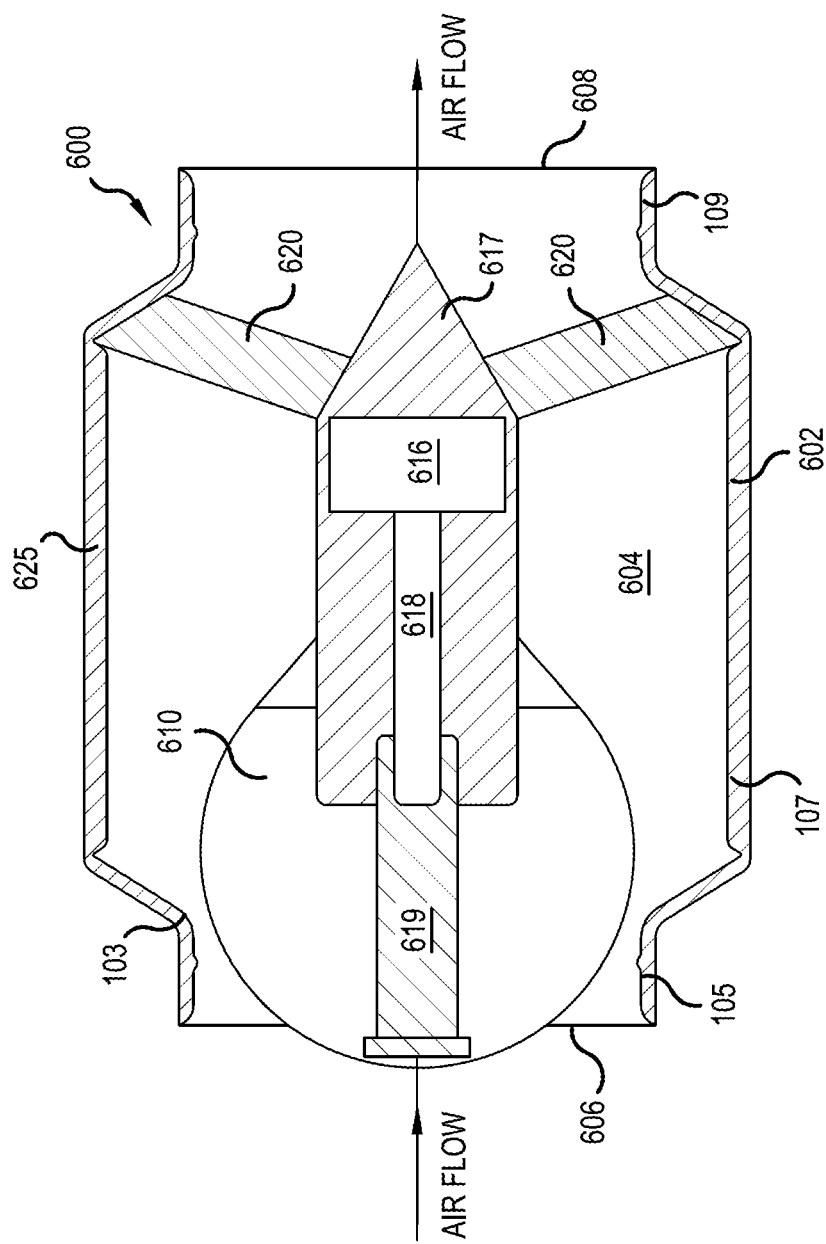

As shown in the embodiment of FIGS. 11 and 12, an alternative embodiment of a flow control valve 600 incorporating the various aspects of the invention. FIG. 11 shows the valve in its fully open position, and FIG. 12 shows the valve in a nearly closed position. The valve 600 has a housing 602 defining a flow passage 604, which extends between a flow inlet 606 and a flow outlet 608. The valve 600 further comprises a closing element 610, which at its downstream face is extended by a conical element 612. The closing element 610 is arranged to slide along a motor part comprising a motor 616, a conical extension 617, a rotor 618, and a stator 619. In operation, the motor 616 causes the rotor 618 to rotate, which in turn causes the stator 619 to slide longitudinally along the rotor 618, so as to thereby move the closing element 610 in a longitudinal direction.

Operation of the motor may be controlled by a control unit (not shown). The motor part is supported by cross bars 620, which are connected to the housing 602.

Processor 623 is connected to motor 616. The pressure difference sensor 621 and the pressure sensor 624 are connected to actual sensing elements (unnumbered) by wires. A position sensor 622 is mounted next to the motor. The pressure difference sensor may be placed either outside the housing or alternatively inside the motor casing. In either case, the important part is its ability to measure the pressure difference across the closing element, i.e. its connection to measuring points before and after the closing element. The pressure sensor may advantageously form part of the pressure difference sensor, or may alternatively be a separate sensor arranged outside the housing or optionally inside the motor casing or closing element to measure the pressure where desired. Likewise, the electronic processor may be placed inside the motor casing together with the electronic motor or optionally outside the housing.

Figure 13:
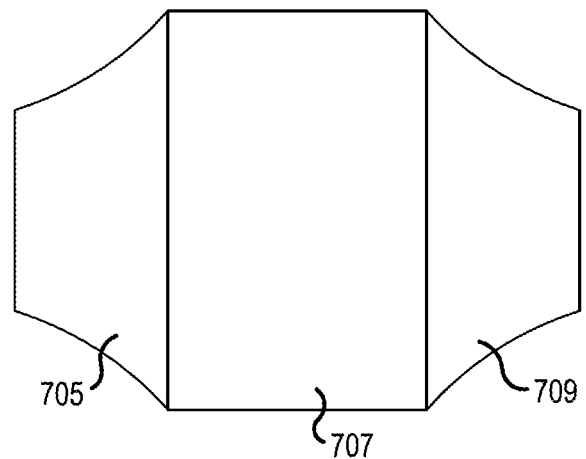
FIGS. 13 and 14 illustrate two configurations of a flow duct according to the fifth aspect of the invention.
Figure 14:
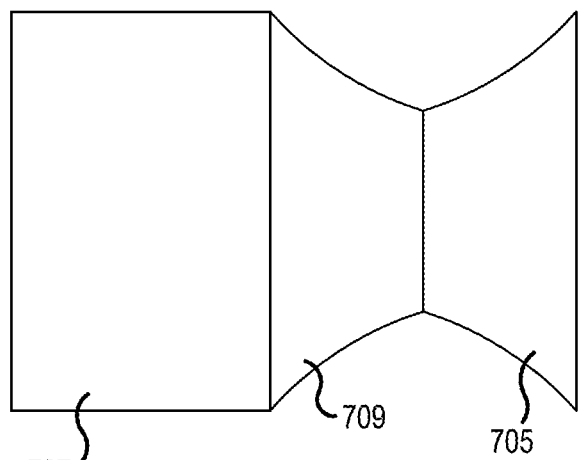

FIGS. 13 and 14 illustrate a flow duct according to the invention, comprising three separable sections 705, 707 and 709. Two of the sections, 705 and 709 have a first end of a first diameter and a second end of a second diameter, the second diameter being larger than the first diameter. In a first configuration of the flow duct, as shown in FIG. 13, the first ends of the two sections define an inlet and an outlet of the flow duct, respectively. The intermediate section 707 may e.g. house a flow control valve as described and claimed herein. In a second configuration of the flow duct, as shown in FIG. 14 the second ends of the two sections define an inlet and an outlet of the flow duct, respectively. In the configuration of FIG. 13, the first ends of sections 705 and 709 define inlet and outlet with a relatively small diameter, with section 707 constituting an intermediate section. In the configuration of FIG. 14, the second ends of sections 705 and 709 define inlet and out with a relatively large diameter, with section 707 constituting an upstream or downstream extension of the flow duct. It will be appreciated that further duct sections may be connected to the sections shown in FIGS. 13 and 14. In some embodiments, the diameter variations of the flow duct of FIGS. 13 and 14 is at the cost of pressure loss, however for many applications, this cost may be outweighed by the amount of cost saved due to the fact that the flow duct fits into systems of at least two different diameters, such as ø 160 mm and ø 250 mm.

All of the embodiments disclosed above and shown in FIGS. 1-14 may also incorporate the invention according to the third aspect of the invention, in which a pressure difference sensor (not shown) is provided for detecting a pressure difference across the closing element 110, 210, 310, 410, 510 and 610. A position sensor (not shown) may further be provided for detecting a position of the closing element 110, 210, 310, 410, 510, 610 between the fully open and the fully closed position. An electronic memory loaded with a table of closing element positions and corresponding valve-specific flow constant values may be provided, so that an electronic processor appropriately programmed may determine a flow rate based on the pressure difference across the closing element, the position of the closing element and a valve-specific constant at any detected position of the closing element, the flow rate being determined as $q=k\sqrt{\Delta p}$, where q expresses the volume flow rate, k is the valve-specific constant, and $\Delta p$ is the pressure difference across the closing element.

Generally, the movement of the closing element may be controlled and/or performed manually. Hence, a manually operated structure may be provided for moving the closing element between the open and closed positions.

In variations of the present invention, the motors and actuator may generally be replaced by a biasing structure, including for example one or more springs, which provides a constant biasing force to the closing element in a direction towards an upstream end of the valve. Accordingly, the housing and closing element of the present invention may easily be modified to function as a spring-loaded non-return valve or check valve.

The invention claimed is:

1. A flow control valve comprising:
    a housing, which defines a longitudinally extending passage between an flow inlet and a flow outlet of the housing;
    a closing element in the passage, wherein at least a portion of the closing element is movable between a fully open position, in which a gas is allowed to flow past the closing element, and a fully closed position, in which the closing element closes said passage near the flow inlet, so that no gas is allowed to flow past the closing element, wherein a clearance for gas flow is provided between the closing element and an inner wall of the housing when said portion of the closing element is in the open position;
    a motor casing provided in the passage downstream of the closing element, wherein the closing element is arranged to slide along the motor casing, the motor casing comprising an electric motor for causing the closing element to move between the open and closed positions and wherein the motor is connected to the closing element via a driving element;
    a pressure difference sensor for detecting a pressure difference across the closing element;
    a position sensor for detecting a position of the closing element or said portion thereof between the fully open and the fully closed position; and
    an electronic memory loaded with a table of positions of the closing element or said portion thereof and corresponding valve-specific constant values; and
    an electronic processor programmed to determine a flow rate based on the pressure difference, the position and the corresponding valve-specific constant at any detected position of the closing element or said portion thereof.

2. The flow control valve according to claim 1, wherein at least a part of the closing element and/or a part of the housing is covered with a material having sound and/or vibration damping characteristics.

3. The flow control valve according to any claim 1, wherein at least the closing element and the housing are a fire resistant material.

4. The flow control valve according to claim 1, wherein the motor casing is arranged in the passage at a distance from the closing element.

5. The flow control valve according to claim 1, wherein the motor or actuator is located in a motor casing, which is arranged in the passage, and wherein the closing element forms a telescopic overlap with the motor casing.

6. The flow control valve according to claim 1, further comprising an electronic control unit for controlling operation of the motor or actuator, and further comprising a pressure sensor for detecting a pressure in the flow passage, wherein:
    the pressure sensor is configured to pass an electronic signal representative of the pressure to the control unit, and
    the control unit is configured to control the movement of the closing element in response to at least said signal.

7. The flow control valve according to claim 1, wherein a cross-section of the passage is larger at a position between said inlet and the closing element in the fully open position than at the inlet.

8. The flow control valve according to claim 1, wherein a flow cross-section of the passage through the housing at any longitudinal position is at least equal to the flow cross-section of the flow inlet of the housing, when said portion of the closing element is in the fully open position.

9. The flow control valve according to claim 1, wherein the motor casing comprises a conical extension.

10. The flow control valve according to claim 1, wherein the gas is air.

\* \* \* \* \*